Figure 1:
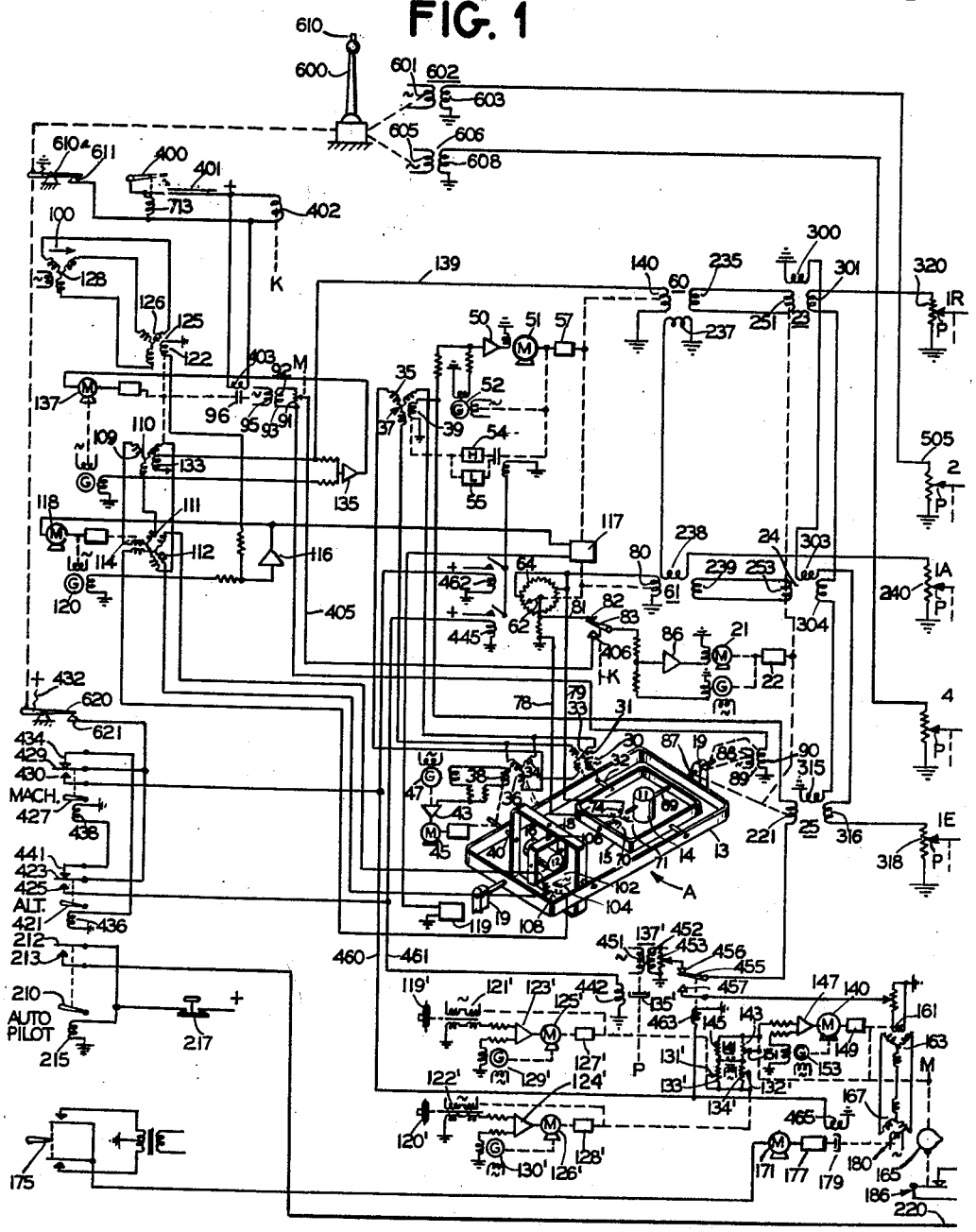

Jan. 29, 1963  P. A. NOXON  3,075,729
AUTOMATIC CONTROL SYSTEM
Filed June 1, 1956  2 Sheets-Sheet 1

INVENTOR.
PAUL A. NOXON
BY
Oscar B Brumback
ATTORNEY

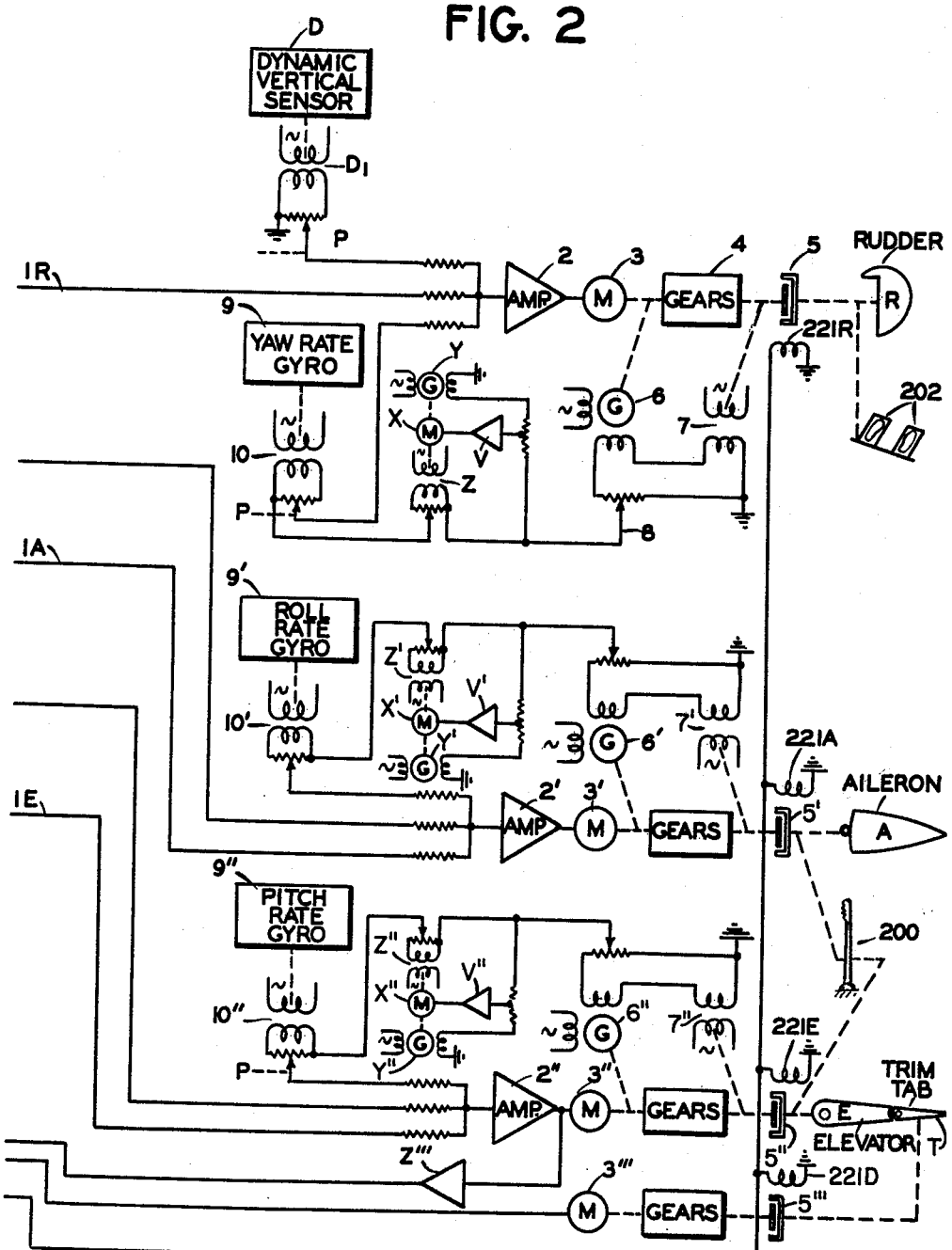

United States Patent Office 3,075,729
Patented Jan. 29, 1963

3,075,729
AUTOMATIC CONTROL SYSTEM
Paul A. Noxon, Tenafly, N.J., assignor to The Bendix Corporation, a corporation of Delaware
Filed June 1, 1956, Ser. No. 588,765
13 Claims. (Cl. 244—77)

This invention relates generally to automatic control systems and reference devices therefore.

The vertical and directional gyroscopes as heretofore known have been generally adequate for ordinary civil purposes to provide signals to stabilize an aircraft on a predetermined course and in a predetermined attitude. Such conventional sensing equipment, however, is likely to be operationally inadequate for military purposes because of the problem of gimbal lock, particularly in the vertical gyroscope.

The present invention contemplates a gyroscopic reference device which combines the function of a directional and vertical gyro and is not subject to gimbal lock. The reference device being stable throughout flight maneuvers that may include inversions, loops, and Immelmans, therefore, can supply continuous navigational information throughout the flight operation.

Conventionl navigation information has been geographical or earth referred coordinate information for determining the azimuth, elevation, and roll of a craft; azimuth being the angle between the projection of the longitudinal axis of the craft on the plane of the earth's surface and a line pointing northwardly; elevation being the angle between the longitudinal axis of the craft and the horizontal plane measured in a plane perpendicular to the horizon and containing the longitudinal axis of the craft; and roll being the angle between the horizontal and the lateral axis of the craft measured in a plane perpendicular to the longitudinal axis of the craft and containing the lateral axis of the craft. However, except for the special condition of straight and level flight the displacements and velocities of the craft about the axes of the craft are not the same as the displacements and velocities of the craft relative to the axes of the earth.

An object of the present invention, therefore, is to provide a novel apparatus for resolving the geographical information concerning an aircraft relative to the earth into control information for the aircraft relative to each body axis of the craft.

Another object is to provide a novel attitude and directional reference device which is free from gimbal lock.

Another object is to provide an attitude reference system capable of providing geographical reference data concerning a movable body and also capable of converting the data into body axis reference data.

Another object is to provide a novel system for synchronizing the geographical reference sensors at zero while the aircraft is being maneuvered about an axis at a rate corresponding to the extent of displacement of a manual controller.

Another object is to provide a novel means for controlling the speed of an aircraft.

Another object is to provide a novel means for selectively controlling an aircraft to maintain constant altitude or constant airspeed and an interlock so that only one selection may be made at a time.

Another object is to provide a novel automatic control system for aircraft wherein the pitch attitude is synchronized during manual control and is washed out during automatic control to maintain constant airspeed or altitude.

Another object is to provide a novel means for controlling a craft wherein changes in heading are washed out, the wash-out lag being used to stabilize the control of the craft.

Another object is to provide a novel system for controlling each flight control surface of an aircraft as a function of several controlling conditions.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings wherein like parts are marked alike:
FIGURE 1 illustrates one portion of the novel automatic control system of the present invention; and
FIGURE 2 illustrates another portion of the novel automatic control system.

FIGURES 1 and 2 are to be placed together to illustrate the complete automatic control system, the leads shown on FIGURE 1 continuing on to FIGURE 2.

The novel attitude reference system of the present invention is illustrated herein as being incorporated in a conventional automatic control system for aircraft. The automatic control system is illustrated herein as having control channels for the yaw, roll, and pitch control surfaces and for the power plants of the craft.

Each control channel of the automatic control system includes a servosystem of conventional type. As shown in FIGURE 2 in the rudder surface control channel, for example, a command signal of reversible phase and variable amplitude may be transmitted by lead 1R to a conventional discriminator type amplifier 2 whose resulting output controls the direction of rotation of a servomotor 3 in accordance with the phase of the input signal. The motor is mechanically connected in a conventional manner, with a gear train 4 and a suitable clutch, such as magnetic clutch 5, to displace rudder R. So as to control the rate and extent of motor operation, motor 3 also drives a conventional rate generator 6 and a follow-up inductive device 7; rate generator 6 providing a signal proportional to the rate or speed of operation of the motor, and follow-up device 7 providing a signal proportional to the extent of motor operation. By way of lead 8, these rate and follow-up signals are fed back degeneratively to amplifier 2 to cause the rate and extent of motor operation to correspond to the amplitude of the signal input to the amplifier.

As the displaced rudder surface causes the craft to turn about the yaw axis, a conventional yaw rate gyro 9 responds to the rate of turning and develops at inductive device 10 a signal corresponding in phase and amplitude to the direction and rate of turning. This yaw rate signal applied to the amplifier 2 tends to operate the servomotor in a direction to stop the movement of the craft. Thus, the rate gyro damps the action of the craft about its axis.

The yaw control channel also includes a conventional dynamic vertical sensor D. In response to a slipping or skidding of the craft, this sensor actuates an inductive device D1 to develop a signal for amplifier 2 to stop the slipping or skidding.

Turning to the aileron control channel where elements similar to those above are designated by prime numbers, an input signal by way of lead 1A to amplifier 2' operates motor 3' to displace the aileron surface in a direction corresponding to the phase of the signal and at a rate and to an extent corresponding to the amplitude of the signal. When the displaced aileron surface causes the craft to turn about its roll axis, the roll rate gyro 9' responds to the rate of turn and develops a signal which is applied to amplifier 2' and tends to operate motor 3' in a direction to stop the turning, thereby damping the action of the craft about the roll axis.

Similarly, the elevator control channel comprises an amplifier 2", a servomotor 3", rate generator and follow-up devices 6", 7" and a pitch rate gyro 9". Thus, a command control signal input to the amplifier 2" by way of lead 1E operates the motor to displace the elevator surface E in a direction corresponding to the phase of the signal and at a rate and to an extent corresponding to the magnitude of the signal. As the displaced elevator surface causes the craft to turn about the pitch axis, the pitch rate gyro 9" develops a corresponding signal for the amplifier 2" to stop the turning, thereby damping the action of the craft about its pitch axis.

While the follow-up signals in each of the above channels are desirable for transient control conditions, they are not desirable when a condition is changed, for example, due to a shifting of the cargo or the consumption of fuel when a sustained displacement of the control surface is required to trim the craft. Accordingly washout circuits are provided in each follow-up circuit. Each washout may comprise an amplifier V, a motor X, a rate generator Y and an inductive device Z. In response to an input signal to the amplifier V, motor X operates to drive inductive device Z to develop a signal to cancel the input to the amplifier. Due to the degenerative feedback from the rate generator Y, the motor cannot respond to transient signal and operates only slowly in response to a sustained signal to cancel out the sustained signal.

The elevator channel also includes a trim tab control. The signal from the elevator amplifier 2" is fed to a trim tab amplifier Z'" which controls a motor 3'" which operates a trim tab T to relieve a sustained load on the elevator surface.

The foregoing is intended to represent a conventional automatic control system for aircraft. In accordance with the present invention, the command control signal for such a control system may be supplied from either the novel attitude reference system A or from a manual controller B shown in FIGURE 1.

The novel attitude reference system A includes a conventional type vertical gyroscope 11 and a conventional type directional gyroscope 12. Both gyroscopes are mounted in their own gimbal systems and in addition are jointly suspended in a cradle or outer gimbal 13. Normally this common outer gimbal would constitute the housing of each gyroscope and in accordance with the present invention, is mounted in pedestals 19 for rotation about the roll axis.

Vertical gyroscope 11 provides signals corresponding to the pitch and bank attitudes of the craft relative to the earth. The rotor of vertical gyroscope 11 spins about a normally vertical axis in a case 14 which constitutes the inner gimbal and which pivots about the bank axis in a second gimbal 15 mounted on the cradle 13 for rotation about the pitch axis. Since the spin axis of the vertical gyro tends to remain upright in space regardless of the motions of the craft, a suitable erection system (not shown) is provided to constrain the spin axis to an upright position relative to the earth.

Directional gyroscope 12 also is provided with a suitable erection system (not shown) and is mounted on four gimbals. The directional gyroscope has a rotor spinning about a normally horizontal axis in a case 16 which constitutes the inner gimbal; this inner gimbal is mounted for rotation about a second horizontal axis in a gimbal 17; this gimbal 17 is mounted for rotation about a vertical axis in a gimbal 18; and gimbal 18 is mounted for rotation about a horizontal axis in cradle 13.

Cradle 13 is journalled in pedestals 19 and positioned therein by a motor 21 through a gear train 22. At the same time, motor 21 operates an arrangement of bank resolvers 23, 24 and 25 whose inputs are signals corresponding to geographical information relative to the craft and whose outputs are signals corresponding to body axis information for stabilizing and orienting the craft.

By way of a pair of transmitter receiver arrangements, the directional gyro is stabilized in vertical and the vertical gyro is synchronized when it is not being used to control the craft. These arrangements have a common transmitter inductive device 31. The rotor 30 of inductive device 31 is energized and is mechanically connected in a well known manner with the pitch axis trunnion 32 of vertical gyro 11. The stator 33 of transmitter 31 is mechanically connected with cradle 13 and is electrically connected to the stators 34 and 35 of a pair of inductive receiver devices 36 and 37 to form the transmitter-receiver arrangements.

As is well known in transmitter-receiver arrangements, as long as the transmitter rotor 30 and a receiver rotor 38, 39 are in a position of agreement with respect to their associated stators, no output is developed at the respective receiver rotor. However, when an error in the position of the transmitter and receiver rotor exists, a signal output corresponding in phase and amplitude to the direction and extent of the error is developed at the receiver rotor.

The first pair of transmitter and receiver arrangements comprising inductive devices 30 and 36 maintain gimbal ring 18 of directional gyro 12 perpendicular to the normally horizontal gimbal ring 15 of vertical gyro 11. When an error exists between the relative position of trunnion 32 of vertical gyro 11 and trunnion 40 of directional gyro 12 with respect to cradle 13, the error signal from rotor 38 is applied through a conventional discriminator type amplifier 43 to operate a conventional induction motor 45 to drive trunnion 40 into a position of agreement with respect to trunnion 32. A conventional rate generator 47 driven by motor 45 provides a feedback signal to damp the motor operation. Thus, for any maneuver of the craft, gimbal ring 18 of directional gyro 12 is maintained perpendicular to gimbal ring 15 of vertical gyro 11 with the cradle 13 providing the reference.

The second of the pair of transmitter receiver arrangements comprises inductive devices 30 and 37 and is a portion of a nulling or synchronizing system comprised of a conventional discriminator type amplifier 50, a conventional induction motor 51, and a conventional rate generator 52. An output signal from rotor 39 corresponds to an error in the positions of rotors 30 and 39. This signal is applied to amplifier 50 to operate motor 51 in a direction to selectively drive rotor 39 through a high speed gear train 54 or a low speed gear train 55 into positional agreement with rotor 30. At the same time, motor 51 through a suitable gear train 57 actuates a pair of elevation resolvers 60 and 61 and the wiper 62 of a voltage divider 64.

On the inner trunnion 69 of vertical gyro 11 is fixed in a known manner the rotor 70 of an inductive device 71 whose stator 74 is fixed to gimbal ring 15 for the displacement of rotor 70 relative to stator 74. The inner gimbal 14 and outer gimbal 15 of vertical gyro 11 normally remained horizontal, and any displacement of the craft in roll develops at stator 74 a signal corresponding in phase and amplitude to the direction and extent of the displacement. This signal is applied by way of leads 78 and 79 across voltage divider 64 which changes the value of the signal as a function of pitch attitude. In one mode of operation, the signal is applied to winding 80 of resolver 61; and, in another mode, the signal is also applied by way of lead 81, contact 82, and armature 83 to a conventional discriminator type amplifier 86 whose output is adapted to operate motor 21 to turn trunnion 87 of cradle 13 so as to reduce the displacement between the inner and outer gimbals 14, 15.

The angle of displacement of trunnion 87 from a normal position relative to pedestal 19 becomes a command function when the craft is under control of the automatic control system so that the craft, in effect, is driven around cradle 13 by the automatic control system to maintain the inductive device 71 at null. To measure the angular displacement of trunnion 87, the rotor 88 of an inductive device 89 is fixed in a known manner to trunnion 87 for displacement relative to a stator 90 fixed with pedestal 19. The signal corresponding in phase and amplitude to the direction and extent of this displacement is fed to a potentiometer 91 which is connected across the stator 92 of an inductive device 93. The rotor 95 and stator 92 are normally at null, but when a magnetic clutch 96 is engaged, rotor 95 is displaced relative to stator 92 to develop at the stator a signal corresponding in phase and amplitude to the direction and extent of displacement of the craft from the heading at which clutch 96 is engaged.

The system for actuating inductive device 93 comprises directional gyro 12 and a pendulous compass system 100 for correcting gyro 12 for random drift and for the drift due to the earth's rotation. To this end, an inductive transmitter device 102 has a rotor 104 connected in a known manner for actuation by the trunnion 106 of directional gyro 12 and a stator 108 fixed with outer trunnion 106. Thus displacement of the craft in azimuth relatively displaces rotor 104 and stator 108.

Rotor 104 of transmitter inductive device 102 is energized and stator 108 is connected to the stator 109 of an inductive receiver device 110 through a differential inductive device 111; stator 108 being connected to stator 112 of differential inductive device 111 whose rotor 114 is connected to stator 109 and is positioned by a torque system comprised of an amplifier 116, a motor 118, and a rate generator 120.

The input for amplifier 116 is derived from the rotor 122 of an inductive device 125 whose stator 126 is connected to the transmitter 128 of a pendulous compass 100 which may be similar to that described in a copending application Serial No. 221,447 now U.S. Patent No. 2,755,562, assigned to the assignee of the present invention. The displacement of a compass needle of the pendulous compass changes the relative voltages in the windings of transmitter 128 producing a resultant voltage corresponding to the magnetic heading. This resultant voltage is reproduced in stator 126 of receiver 125 and, when rotor 122 is not at a null position with respect to this resultant, the signal developed at rotor 122 corresponds in phase and amplitude to the direction and extent of the error and is applied to the input of amplifier 116. The output of amplifier 116 operates motor 118. Switches 117 and 119 short out motor 118 when prescribed angles of pitch and bank are exceeded because at these angles the pendulous compass signal may not be accurate.

The altitude and airspeed sensors may be similar in that the static and dynamic pressure lines of the craft cause aneroids 119' and 120', respectively to expand or contract with changes in pressure and position the slug of conventional "E" type pick-offs 121' and 122'. Upon movement of the slug relative to the case, the resulting signal from the pick-off is fed into amplifiers 123' and 124' whose output operates a servomotor 125' and 126' which through a suitable gear train 127' and 128' drives the pick-off case to a new null position and also positions a wiper 131' and 132' on potentiometer 133' and 134'. A conventional rate generator 129' and 130' damps the operation of the motor.

Considering now the altitude control sections, motor 125' positions the wipers P of the gain adjusting potentiometers so as to vary the signals to the servomotors 3, 3' and 3'' as a function of altitude. When clutch 135' is engaged, motor 125' positions the rotor of inductive device 137'.

Considering the Mach number computing section, this may be similar to that described in copending application Serial No. 514,934 by Rossire et al., now abandoned, wherein servomotor 140 is utilized to maintain a Wheatstone bridge 141 normally balanced to solve the equation:

$$\frac{\Delta P}{P_s} = (1 + 02M^2)^{3.5} - 1 \text{ for M of 0-1}$$

$$\frac{\Delta P}{P_s} = \left[\frac{166.92 \ M^2}{(7-M^{-2})^{2.5}}\right] - 1 \text{ for M of 1-1.2}$$

The four legs of the Wheatstone bridge are, potentiometer 133' whose value is linear with static pressure, potentiometer 134' whose value is linear with dynamic pressure, potentiometer 143 whose value is non-linear with Mach number, and a resistor 145 whose value is fixed. The signal from bridge 141, when the bridge is unbalanced, is fed to an amplifier 147 whose output operates servomotor 140 which through a suitable gear train 149 positions the wiper 151 of potentiometer 143 to rebalance the bridge. A conventional rate generator 153 damps the operation of the motor.

The shaft position of motor 140 corresponds to Mach number. Positioned by the motor shaft are the wiper M of potentiometer 91 to adjust the heading signal as a function of Mach number, a cam 165, and the rotor 161 of an inductive receiver device 163 which is used in conjunction with an inductive transmitter device 167 to provide a Mach error signal for the control of the craft.

The rotor 180 of the transmitter 167 is driven by a motor 171 which is operated at a constant speed in either a clockwise or counter-clockwise direction, or not at all, depending upon the actuation of a switch 175. Through a gear train 177, and a magnetic clutch 179, motor 171 drives rotor 180 of transmitter 167 to provide a speed error signal when rotors 180 and 161 are not in positional agreement. Transmitter may be advantageously of the type disclosed is copending application Serial No. 154,567, of Noxon, now abandoned, and includes a centering arrangement (not shown) so that when the system is not being operated to maintain the craft at a constant speed, clutch 179 is open and rotor 180 is maintained in a central position.

The cam 165 positioned by the shaft of motor 140 opens contacts 186 to deenergize the trim tab servomotor 3''' at high Mach numbers.

So that the aircraft may be operated manually by the human pilot if desired, a steering column 200, FIGURE 2, is connected by suitable mechanical linkages to the aileron and the elevator control surfaces and rudder pedals 202 are connected to the rudder so that the human pilot can manually operate these surfaces by moving the steering column or pedals. The automatic control system is synchronized with the movements of the craft during this manual control so that it can take over control at any time.

The automatic control system is energized by conventional means (not shown) which supplies excitation to the gyroscope, inductive devices and amplifiers. If the bank attitude of the craft not be level during manual control, the displacement of case 14 relative to gimbal 15 displaces rotor 70 of inductive device 71 relative to stator 74 to develop a signal corresponding in phase and amplitude to the direction and extent of relative displacement. By way of leads 78, 81, contact 82 and armature 83 the signal is applied to amplifier 86 whose output operates motor 21 to turn cradle 13 in supports 19 so as to reduce the displacement of rotor 71 and stator 74 and so maintain cradle 13 in a level position. Similarly a deviation of the craft in pitch during manual control relatively displaces gimbal 15 and cradle 13 so that rotor 30 of inductive device 31 is displaced relative to stator 33 to develop a signal corresponding in phase and amplitude to the direction and extent of relative displacement. The varying voltages induced in stator 33 are reproduced in stator 35. If rotor 39 not be at a null with respect to the resultant of stator 37, i.e. rotors 30 and 39 not be in positional agreement, an output corresponding in phase and amplitude to the direction and extent of disagreement is developed at rotor 39. Through amplifier 50, this output operates motor 51 to drive rotor 39 into positional agreement by way of high speed gear train 54. In this manner rotors 30 and 39 are maintained in a position of agreement so that the output from rotor 39 is normally zero. Any displacement of gimbal 18 from a position perpendicular to gimbal 15 cause a difference in position of rotors 30 and 38 to exist relative to stators 33 and 34, and the resultant output through amplifier 43 operates motor 45 to bring rotors 30 and 38 into a position of agreement, thereby maintaining gimbals 15 and 18 in perpendicular relationship.

Any change in heading of the craft during manual control displaces rotor 104 of inductive device 102 relative to stator 108. The varying voltages induced in stator 108 are applied by way of differential inductive device 111 to the receiver inductive device 110. Should rotor 133 of inductive device 110 not be at null relative to the voltages in stator 109 the output from rotor 133 is applied through amplifier 135 to a motor 137 which turns rotor 133 to a null. At the same time the motor positions rotor 122 of inductive device 125 which receives a voltage from the pendulous compass unit 100. If rotor 122 not be at a null relative to the resultant in stator 126, the output is applied to an amplifier 116 which operates motor 118 to position the rotor 114 of differential 111. When a balance has been established rotor 122 is at a null relative to the voltage in stator 126 and the rotor of differential inductive device 111 has been so positioned with respect to stator 109.

In the foregoing manner, the novel attitude reference A is synchronized with the attitude of the aircraft as to bank, pitch, and azimuth. Should any signal exist in the signal chain as an input to an amplifier 2, 2', 2", the motor 3, 3', 3" operates to displace the rotor of follow-up device 7, 7', 7" in a direction so as to develop the signal opposing the signal in the signal chain to maintain the net input to amplifier 2 at zero.

To place the automatic control system into operation to control the craft, switch arm 210 is moved downwardly to an energized position thereby engaging armature 212 with contact 213. This switch 210 may advantageously be of the type described in Patent No. 2,734,963 so that once the switch arm is engaged, it is held in an engaged position by a solenoid 215; and upon the deenergization of the solenoid as by depressing a quick release button 217, the switch arm 210 is moved to the disengaged position shown.

The engagement of armature 212 with contact 213 supplies energization by way of lead 220 to the coils 221D, 221E, 221A, and 221R of clutches 5, 5', 5", 5''' connecting the servomotors 3, 3', 3" and 3''' with the surfaces R, A, E and T. The surfaces R, A, E and T are now placed under the control of the automatic control system.

After the craft has been placed under automatic control, a displacement of the craft in pitch from the engaged attitude displaces rotor 30 relative to stator 31 so as to destroy the positional agreement existing between rotors 30 and 39, and the output from rotor 39 which corresponds to the change in pitch is applied to the rotor 221 of bank resolver 25. Should the craft deviate from the bank condition, rotor 70 is displaced relative to stator 71 to provide a signal which corresponds in phase and amplitude to the direction and extent of displacement and which is applied to the rotor 80 of pitch resolver 61. Should the craft experience a change in heading, the resulting output from rotor 133 is applied by way of lead 139 to the rotor 140 of pitch resolver 60.

Resolvers 60 and 61 are of the well known type having a displaceable rotor inductively coupled with two stator windings. The magnetic axes of the stator windings are mutually perpendicular so that the voltage induced in each of the stator windings by the rotor winding is a trignometric function of the angle of displacement of the magnetic axis of the rotor winding; the voltage in one stator winding being proportional in magnitude to the product of the voltage on the rotor winding and a cosine of the angle of displacement of the rotor relative to the stator and the voltage in the other winding varying with the sine of the angle of displacement.

The rotors 140 and 80 of resolvers 60 and 61 respectively are displaced by motor 51 so that the angle of displacement corresponds to the pitch attitude of the craft. The output from winding 235 therefore corresponds to $\psi \cos \theta$ where $\psi$ is the heading error and $\theta$ is the pitch attitude of the craft and the signal from winding 237 corresponds to $\psi \sin \theta$. In a similar manner the signal $\phi$ corresponding to the angle of bank of the craft is applied to the rotor winding 80 of resolver 61 to provide two other signals which are trignometric functions of the pitch attitude; the signal appearing at winding 238 correspond to $\phi \cos \theta$ and the signal at winding 239 corresponding to $\phi \sin \theta$. Windings 237 and 238 are connected in series so that the signal appearing across potentiometer 240 corresponds to $\psi \sin \theta - \phi \cos \theta$.

The signals from winding 235 and 239 of resolvers 60 and 61 are applied to the rotors 251 and 253 of resolvers 23 and 24 whose rotors are positioned by the motor 21 which operates cradle 13 and are therefore positioned as a function of the command bank attitude $\rho$ of the craft. The signal on rotor winding 251 of resolver 23 corresponds to $\psi \cos \theta$ so that the output signal at winding 300 corresponds to $\psi \cos \theta \cos \rho$ and the signal at winding 301 corresponds to $\psi \cos \theta \sin \rho$. The signal on rotor winding 253 coresponds to $\phi \sin \theta$ so that the signal on stator winding 303 corresponds to $\phi \sin \theta \cos \rho$ and the signal on stator winding 304 corresponds to $\phi \sin \theta \sin \rho$. The signal on rotor winding 221 of resolver 25 corresponds to the change in pitch attitude $\theta$ so that the output on winding 315 corresponds to $\theta \sin \rho$ and the output on winding 316 corresponds to $\theta \cos \rho$.

Windings 300, 303 and 316 are connected in series to potentiometer 318 in the elevator channel so that the resulting signal across potentiometer 318 corresponds to the algebraic sum of the signals across these windings or to $\psi \cos \theta \cos \rho + \phi \sin \theta \cos \rho + \theta \cos \rho$. Windings 315, 304, and 301 are connected in series to potentiometer 320 in the rudder channel so that the resultant signal across potentiometer 320 corresponds to the algebraic sum of the signals across these windings or to $\theta \sin \rho + \phi \sin \theta \sin \rho + \psi \cos \theta \sin \rho$. The signal appearing across potentiometer 240 as discussed before corresponds to $\psi \sin \theta - \phi \cos \theta$.

The signals across 318, 320 and 240 are adjusted for a parameter of flight by the adjustment of wipers P by motor 125' as discussed before and applied to the various surfaces as command signals to cause the servomotors 3, 3' and 3" to displace the surfaces R, A and E, as discussed before. The following table shows the percentage of small error signals corresponding to deviations from a selected attitude which are sent to each surface servomotor.

*Comparative Attitude Reference Signals*

| Selected Craft Attitude | Error Signals | Signal Percentages to— | | |
|---|---|---|---|---|
| | | Elevator | Aileron | Rudder |
| Bank 0°, Pitch 0° | Elevation | 100 | 0 | 0 |
| | Bank | 0 | 100 | 0 |
| | Azimuth | 0 | 0 | 100 |
| Bank 22½°, Pitch 0° | Elevation | 92.4 | 0 | 38.3 |
| | Bank | 0 | 100 | 0 |
| | Azimuth | 38.3 | 0 | 92.4 |
| Bank 45°, Pitch 0° | Elevation | 70.7 | 0 | 70.7 |
| | Bank | 0 | 100 | 0 |
| | Azimuth | 70.7 | 0 | 70.7 |
| Bank 90°, Pitch 0° | Elevation | 0 | 0 | 100 |
| | Bank | 0 | 100 | 0 |
| | Azimuth | 100 | 0 | 0 |
| Bank 0°, Pitch 22½° | Elevation | 100 | 0 | 0 |
| | Bank | 0 | 92.4 | 38.3 |
| | Azimuth | 0 | 38.3 | 92.4 |
| Bank 0°, Pitch 45° | Elevation | 100 | 0 | 0 |
| | Bank | 0 | 70.7 | 70.7 |
| | Azimuth | 0 | 70.7 | 70.7 |
| Bank 0°, Pitch 90° | Elevation | 100 | 0 | 0 |
| | Bank | 0 | 0 | 100 |
| | Azimuth | 0 | 100 | 0 |
| Bank 45°, Pitch 45° | Elevation | 70.7 | 0 | 70.7 |
| | Bank | 50 | 70.7 | 50 |
| | Azimuth | 50 | 70.7 | 50 |

To illustrate the above chart, if the aircraft is in a 90° bank and a small deviation from zero pitch attitude occurs the craft is required to dive to return to the zero attitude. The most effective control surface to dive the craft will be the rudder surface so that the entire signal will be applied to the rudder surface.

If the pilot desires to have the automatic control system maintain the craft at a constant heading he engages switch arm 400 with contact 401 to complete a circuit through winding 403 to engage clutch 96 and to energize solenoid 402 which pulls by way of connection K armature 83 downwardly from the position shown. Any deviation of the craft from the heading at this time causes a displacement of rotor 95 relative to stator 92 to develop a signal to operate motor 21 by way of lead 405, contact 406, and armature 83, to displace cradle 13 until the signal developed by the displacement of rotor 88 relative to stator 90 develops a signal equal and opposite to the signal from inductive device 93. Since gimbal 15 is connected to cradle 13 by trunnions 32 the gimbal is moved with cradle 13 to cause a relative displacement of rotor 70 of inductive device 71 relative to stator 74 simulating a banked condition of the craft. The resulting signal is applied through the pitch and bank resolvers, as discussed above, to develop components for the rudder, elevator and aileron control surfaces.

The switches for ordering constant altitude or constant Mach number may be of the type described in the aforementioned Patent Number 2,734,963. To maintain the craft in a predetermined altitude, switch arm 421 is moved downwardly from the position shown thereby engaging armature 423 with contact 425, and to maintain a constant Mach number the switch arm 427 is moved downwardly from the position shown thereby engaging armature 429 with contact 430.

Armatures 423 and 429 are energized from a suitable source of direct current (not shown) by way of lead 432 and provide an interlock since holding solenoid 436 is energized by way of contact 434 and solenoid 438 is energized by way of contact 441. Thus, both constant altitude and constant Mach number may not be ordered at the same time. If the altitude control be engaged and the Mach number control not be engaged excitation from lead 432 by way of armature 429 and contact 434 energizes solenoid 436 to maintain the switch arm 421 in the engaged position. However, if switch arm 427 be pulled downwardly to order constant Mach number the disengagement of armature 429 and contact 434 deenergizes solenoid 436 so that switch arm 421 moves to the disengaged position. Similarly, if constant Mach number be ordered so that switch arm 427 is pulled downwardly engaging armature 429 with contact 430, solenoid 438 will be energized from contact 421 by way of armature 423 if the altitude control not be energized. Solenoid 438 will hold switch arm 437 in the engaged position; but if switch arm 421 be moved to the engaged position to order a constant altitude control, the disengagement of armature 423 from contact 421 deenergizes solenoid 438 and switch arm 427 will be moved to the disengaged position.

Moving switch arm 421 to an engaged position to command a constant altitude control engages armature 423 with contact 425 to supply energization to bus lead 461 thereby energizing winding 442 to engage clutch 135 and thereby energizing solenoid 445. Any displacement of the craft from the altitude at which switch 421 is engaged causes a displacement of rotor 451 relative to stator 452 to develop a corresponding signal across potentiometer 453. This signal is applied to rotor 221 of resolver 25 and resolved into components for the elevator, and rudder surfaces according to the chart above so as to give the most effective control to the surfaces to maintain the craft at the predetermined altitude.

Moving switch arm 405 to an engaged position to maintain the craft at a predetermined Mach number engages armature 429 with contact 430. This energizes bus lead 460 thereby energizing solenoid 462, solenoid 463, and coil 465 of magnetic clutch 179. The energization of relay 463 disengages armature 455 from contact 456 removing any altitude control signal and engages armature 455 with contact 457 so as to place rotor 161 of receiver inductive device 163 in the signal chain to resolver 25.

The position of rotor 161 of receiver 163 corresponds to the actual Mach number. So as to make the position of rotor 180 of transmitter 167 correspond to an ordered Mach number, the energization of coil 465 engages clutch 179 so that by moving speed beeper arm 175 upwardly the motor 171 may be operated in a direction to displace rotor 180 to order an increase in Mach number and by moving the arm downwardly the motor may be operated in a direction to displace rotor 180 to order a decrease in Mach number. When rotors 181 and 161 are in a position of agreement the actual Mach number of the craft corresponds to the ordered Mach number. Any deviation of this condition results in a signal which through resolver 25 is changed into components to provide the most effective action on the craft to bring the craft to the ordered Mach number.

So that the craft may be maneuvered manually through the automatic control system, the system is provided with a manual controller 600 of a conventional type, a suitable controller being described in U.S. Patent No. 2,553,280. The stick of such controllers is universally mounted for movement laterally and longitudinally of the craft. Lateral movement displaces the rotor 601 of inductive device 602 relative to stator 603 to develop a bank signal corresponding in phase and amplitude to the direction and extent of displacement and longitudinal movement displaces the rotor 605 of inductive device 606 relative to stator 608 to develop a pitch signal.

In order to displace the stick from center position a button 610 must be depressed. This disengages armature 610 from contact 611 to deenergize solenoid 713, solenoid 402, and clutch coil 403. Depressing button 610 also disengages armature 620 from contact 621 to deenergize the altitude or Mach number circuit in the event that the craft has been placed under constant altitude or Mach number control. The movement of the controller out of center position or out of detent maintains armatures 610 and 620 out of engagement with contacts 611 and 621.

Displacement of the controller laterally displaces rotor 601 relative to stator 603 to develop a corresponding signal. The signal from inductive device 602 and appearing at potentiometer 505 is applied to amplifier 2' to cause the craft to roll at such a rate that the signal developed at inductive device 10' is equal and opposite to the signal developed at rotor 500. At this time the craft is rolling at a rate proportional to the extent of displacement of the controller laterally.

In a similar manner the displacement of the controller longitudinally displaces rotor 605 relative to stator 608 to develop at inductive device 606 a corresponding pitch rate signal. In response to the pitch rate signal, motor 3'' displaces the elevator surface until the craft is in an attitude such that the signal developed at inductive device 10'' equal and opposes the signal from inductive device 606. At this time the rate of change in pitch of the craft is proportional to the displacement of the controller from center position.

During manual control, armature 83 engages contact 82 so as to maintain the cradle 13 and vertical gyro 11 in a normal position despite movement of the craft, and motor 51 will maintain rotor 39 of inductive device 37 synchronized or in positional agreement with rotor 30 of inductive device 31. Upon return of the stick to normal position, the craft will be maintained in the last altitude of the craft.

The foregoing has presented an automatic control system with a novel reference device therefor. The novel reference device resolves the geographical and earth coordinate information relative to the aircraft into control information relative to earth axis of the craft so that the most effective action is applied to the craft. The novel attitude device also applies altitude or airspeed signals to the surface most effective in control of the craft for its instant attitude.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a control system for an aircraft, means for developing a signal corresponding to the displacement of the craft from a predetermined roll attitude, means for modifying said signal as a sine function of the pitch angle of the craft, and power means under the control of said modified signal for actuating the rudder surface of said craft.

2. In a control system for an aircraft, means for developing a signal corresponding to the displacement of the craft from a predetermined roll attitude, means for modifying said signal as a sine function of the pitch angle of the craft, means for further modifying said modified signal as a cosine function of the bank angle of the craft, and power means under the control of said further modified signal for actuating the rudder surface of said craft.

3. In a control system for an aircraft, means for developing a signal corresponding to the angular displacement of the craft from a predetermined yaw attitude, means for modifying said signal as a function of the pitch angle of the craft, means for further modifying said modified signal as a cosine function of the bank angle of the craft to provide a first modified signal, means for developing a signal corresponding to the displacement of the craft from a predetermined roll attitude, means for modifying said latter signal as a sine function of the pitch angle of the craft, means for further modifying said last modified signal as a cosine function of the bank angle of the craft to provide a second modified signal, and power means under the control of said first and second modified signals for actuating the rudder surface of said craft.

4. In a control system for an aircraft, means for developing a signal responsive to the displacement of the craft from a predetermined roll attitude, means for modifying said signal as a cosine function of the pitch angle of the craft, and power means under the control of said modified signal for actuating the aileron surface of said craft.

5. In a control system for an aircraft, means for developing a signal corresponding to the displacement of the craft from a predetermined roll attitude, means for modifying said signal as a cosine function of the pitch angle of the craft to provide a first modified signal, means for developing a further signal corresponding to the displacement of the craft from a predetermined yaw attitude, means for modifying said further signal as a sine function of the pitch angle of the craft to provide a second modified signal, means for summing said first and second modified signals, and power means under the control of said signal summation for actuating the roll surface of said craft.

6. In a control system for an aircraft, means for developing a signal corresponding to the displacement of the craft from a predetermined roll attitude, means for modifying said signal as a sine function of the pitch angle of the craft, and power means under the control of said modified signal for actuating the pitch control surface of said craft.

7. In a control system for an aircraft, means for developing a signal corresponding to the displacement of the craft from a predetermined roll attitude, means for modifying said signal as a sine function of the pitch angle of the craft, means for further modifying said modified signal as a function of the sine of the angle of bank, and power means under the control of said further modified signal for actuating the pitch control surface of said craft.

8. A control system for relatively actuating each of three control surfaces on aircraft, comprising respective power means for each of said surfaces, a resolver adapted to provide two output voltages variable in sine-cosine relationship, one of said power means being controlled by one of said output voltages, a second resolver energized by the other of said two output voltages, and adapted to provide two further output voltages variable in sine-cosine relationship, and each of the other two of said power means, respectively, being controlled by one of said two further voltages.

9. In a control system for an aircraft, means for developing navigation signals for craft corresponding to earth referred coordinates including a vertical gyroscope, a directional gyroscope, and common mounting means for the gyroscopes, position sensing means for detecting a displacement of the vertical gyroscope, motor means controlled by said position sensing means and operable thereby to adjustably position the common mounting means so as to prevent gimbal lock of said gyroscopes, and means for changing said navigation signals into control signals relative to the control axes of the craft.

10. In a control system for a craft, a cradle mounted for rotation about a first axis, a vertical gyro and a directional gyro mounted in the cradle for rotation about other axes parallel to one another and perpendicular to the first axis, means operable by the vertical gyro for maintaining the cradle in a predetermined position about the first axis, and means operable by the vertical gyro for maintaining the directional gyro in a predetermined relationship relative to the vertical gyro about said other axes to prevent gimbal lock of the gyros.

11. In a control system for a craft, a cradle, means mounting the cradle for rotation about a first axis, a vertical gyro having inner and outer gimbal elements rotatable relative to one another, means mounting the outer gimbal element in the cradle for rotation about a second axis perpendicular to the first axis, position sensing means for sensing the relative position of the inner and outer gimbal elements, motor means responsive to the position sensing means for driving the cradle to a position to maintain the inner and outer gimbal elements in a predetermined position relative to one another, a directional gyro having an auxiliary gimbal, means mounting the auxiliary gimbal in the cradle for rotation about an axis parallel to the second axis, second position sensing means for sensing the position of the outer gimbal element of the vertical gyro relative to the cradle, and second motor means controlled by the second position sensing means for adjusting the directional gyro auxiliary gimbal relative to the cradle to maintain the auxiliary gimbal of the directional gyro and the outer gimbal of the vertical gyro in predetermined relationship to prevent gimbal lock of the gyros.

12. In a control system for a craft, a cradle mounted for rotation about a first axis, a vertical gyro and a directional gyro mounted in the cradle for rotation about other axes parallel to one another and perpendicular to the first axis, the directional gyro having an auxiliary gimbal for mounting the directional gyro in the cradle, means operable by the vertical gyro for maintaining the cradle in a horizontal position about the first axis, and means operable by the vertical gyro for maintaining the auxiliary gimbal of the directional gyro in a vertical position to prevent gimbal lock of the gyros.

13. In a control system for a craft, a cradle, means mounting the cradle for rotation about a first axis parallel to the longitudinal axis of the craft, a vertical gyro having inner and outer gimbal elements rotatable relative to one another, means mounting the outer gimbal element in the cradle for rotation about a second axis perpendicular to the first axis, position sensing means for sensing the relative position of the inner and outer gimbal elements, motor means responsive to the position sensing means for maintaining the cradle in a horizontal position about the longitudinal axis of the craft, a directional gyro having an auxiliary gimbal, means mounting the auxiliary gimbal in the cradle for rotation about an axis parallel to the second axis, second position sensing means for sensing the position of the outer gimbal element of the vertical gyro relative to the cradle, and second motor means controlled by the second position sensing means for maintaining the directional gyro auxiliary gimbal in a vertical position.

References Cited in the file of this patent

UNITED STATES PATENTS

| | | | |
|---|---|---|---|
| 2,409,875 | Martin | Oct. 22, | 1946 |
| 2,531,188 | Yates | Nov. 21, | 1950 |
| 2,553,560 | Esval | May 22, | 1951 |
| 2,571,106 | Brannin | Oct. 16, | 1951 |
| 2,595,309 | Slater | May 6, | 1952 |
| 2,602,611 | Glenny | July 8, | 1952 |
| 2,608,867 | Kellogg et al. | Sept. 2, | 1952 |
| 2,621,003 | Meredith | Dec. 9, | 1952 |
| 2,623,714 | Slater | Dec. 30, | 1952 |
| 2,649,264 | Slater et al. | Aug. 18, | 1953 |
| 2,705,116 | Yates | Mar. 29, | 1955 |
| 2,736,517 | Rossire | Feb. 28, | 1956 |
| 2,801,816 | Meredith | Aug. 6, | 1957 |

FOREIGN PATENTS

| | | | |
|---|---|---|---|
| 546,087 | Great Britain | June 26, | 1942 |